United States Patent
Speck

(10) Patent No.: US 6,654,145 B1
(45) Date of Patent: Nov. 25, 2003

(54) DEVICE AND METHOD FOR PREPARING DOCUMENTS FOR MULTICOLOR REPRODUCTION

(76) Inventor: Peter Speck, Bahnhofplatz 6, 76137 Karlsruhe (DE)

( * ) Notice: Subject to any disclaimer, the term of this patent is extended or adjusted under 35 U.S.C. 154(b) by 0 days.

(21) Appl. No.: 09/463,280

(22) PCT Filed: Aug. 14, 1998

(86) PCT No.: PCT/EP98/05174

§ 371 (c)(1),
(2), (4) Date: Mar. 28, 2000

(87) PCT Pub. No.: WO99/09734

PCT Pub. Date: Feb. 25, 1999

(30) Foreign Application Priority Data

Aug. 14, 1997 (DE) .......................... 197 35 380

(51) Int. Cl.⁷ .............................. H04N 1/58; H04N 1/60
(52) U.S. Cl. ....................... 358/1.9; 358/504; 358/518; 358/540; 358/3.26
(58) Field of Search ........................ 358/1.9, 2.1, 3.26, 358/501, 518, 530, 540, 504; 382/167

(56) References Cited

U.S. PATENT DOCUMENTS

| | | |
|---|---|---|
| 4,583,116 A | 4/1986 | Hennig et al. |
| 5,204,918 A | 4/1993 | Hirosawa |
| 5,313,570 A | 5/1994 | Dermer et al. |
| 5,481,379 A | 1/1996 | Yosefi |
| 5,542,052 A | 7/1996 | Deutsch et al. |
| 5,613,046 A * | 3/1997 | Dermer ....................... 358/1.9 |
| 5,636,337 A | 6/1997 | Boenke et al. |
| 5,668,931 A * | 9/1997 | Dermer ....................... 358/1.9 |
| 6,236,754 B1 * | 5/2001 | Harrington .................. 382/199 |
| 6,341,020 B1 * | 1/2002 | Rumph et al. ................ 358/1.9 |
| 6,345,117 B2 * | 2/2002 | Klassen ...................... 382/167 |
| 6,549,303 B1 * | 4/2003 | Trask ......................... 358/1.9 |
| 6,577,777 B1 * | 6/2003 | Yoshino et al. ............. 382/284 |
| 2001/0033686 A1 * | 10/2001 | Klassen ...................... 382/167 |
| 2003/0063301 A1 * | 4/2003 | Klassen ...................... 358/1.9 |
| 2003/0090689 A1 * | 5/2003 | Klassen ...................... 358/1.9 |

FOREIGN PATENT DOCUMENTS

| | | |
|---|---|---|
| EP | 0445066 A2 | 9/1991 |
| EP | 0484890 A2 | 5/1992 |
| EP | 0585521 A1 | 3/1994 |
| WO | 9520796 | 8/1995 |

\* cited by examiner

Primary Examiner—Scott Rogers
(74) Attorney, Agent, or Firm—Birch, Stewart, Kolasch & Birch, LLP

(57) ABSTRACT

The invention relates to an apparatus and a method for preparing a primary original consisting of picture elements in order to produce processed originals for polychromatic reproduction comprising the following steps:

(a) partitioning the primary original into regions which are each assigned to a color class, (b) determining target picture elements within the region of each color class by associating the picture elements to which a source picture element located outside said region is closest according to a predetermined distance measure, (c) labeling non-specific traps in the target picture elements with the color classes of the associated source picture elements and the corresponding distance measures, and (d) generating traps according to predetermined trapping rules by selecting picture elements whose distance measure does not exceed a predetermined trap width, and whose color class determined in step (a), together with the color class of a non-specific trap determined in steps (b) and (c), corresponds to a predetermined trapping rule.

27 Claims, 8 Drawing Sheets

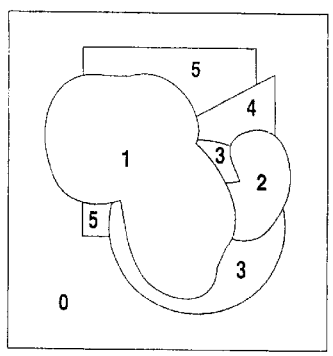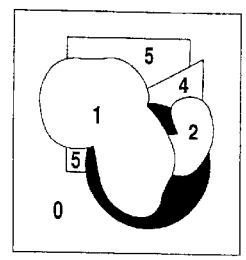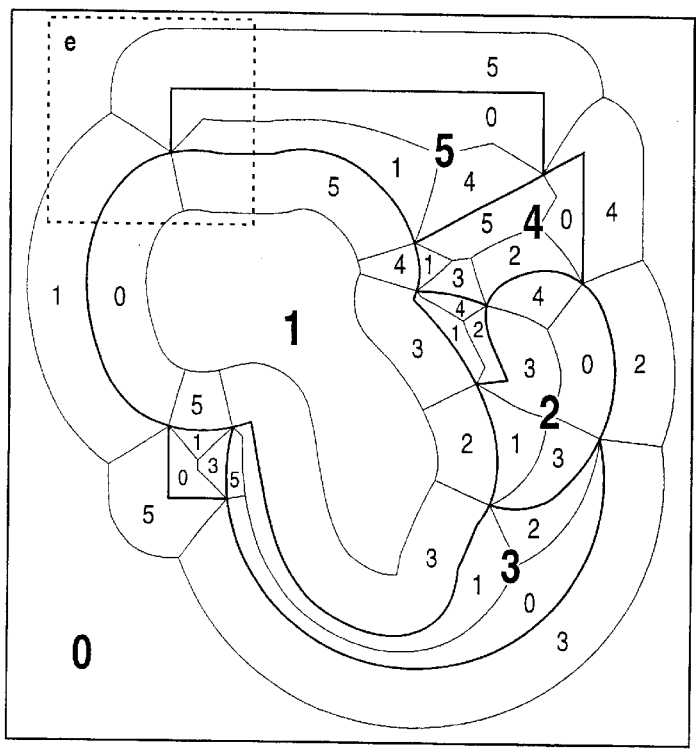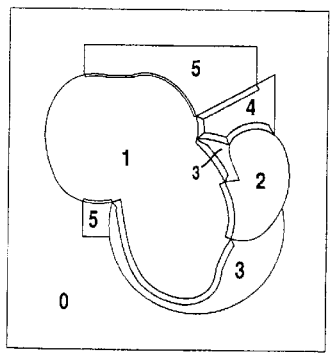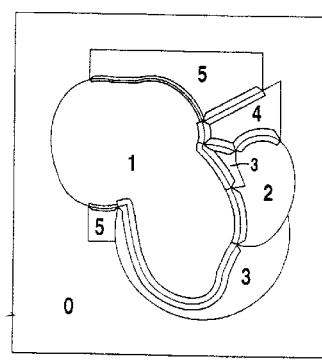
Figure 1

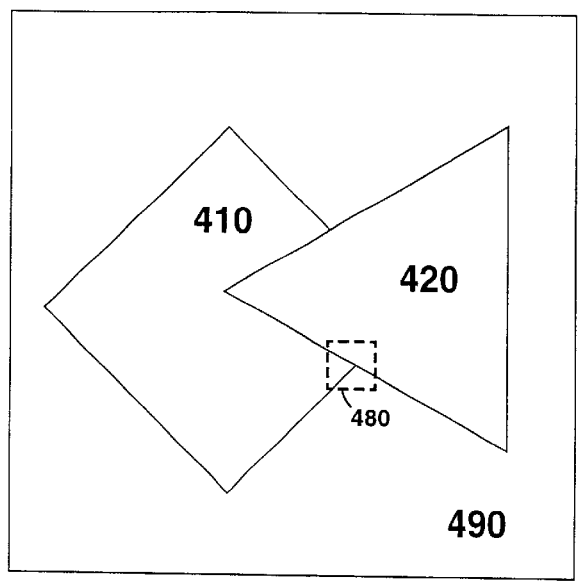
Figure 5
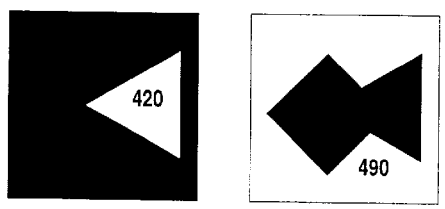
a     b
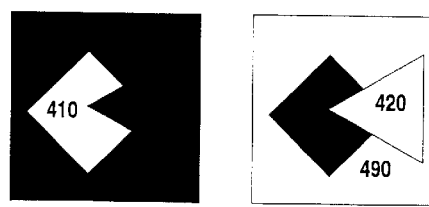
Figure 6    c     d
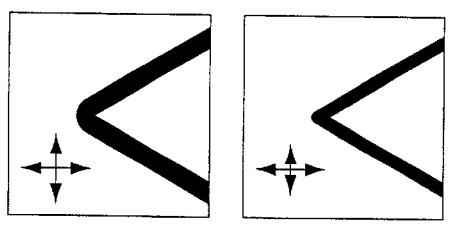
Figure 7    a     b

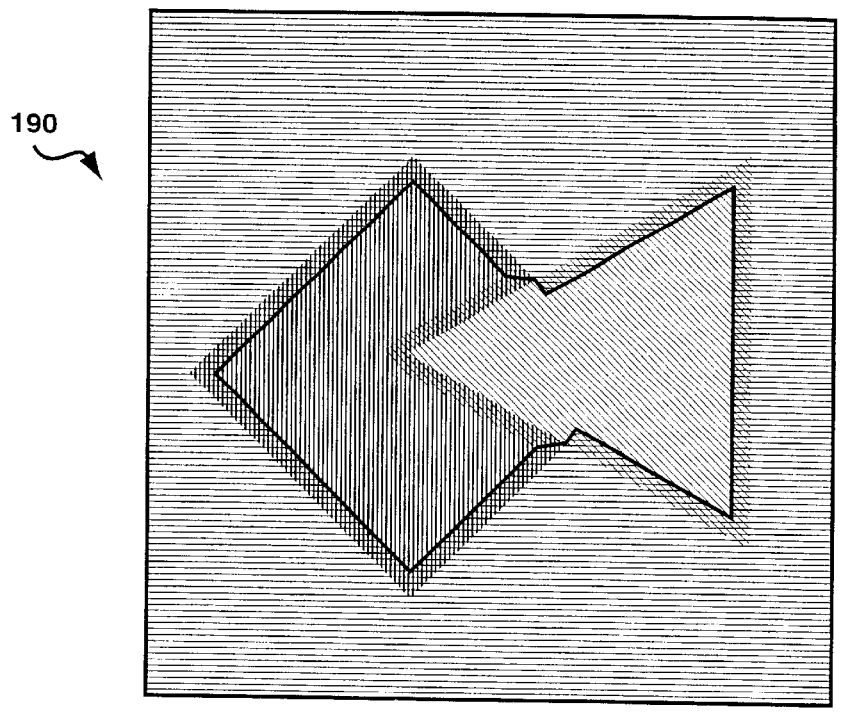
a
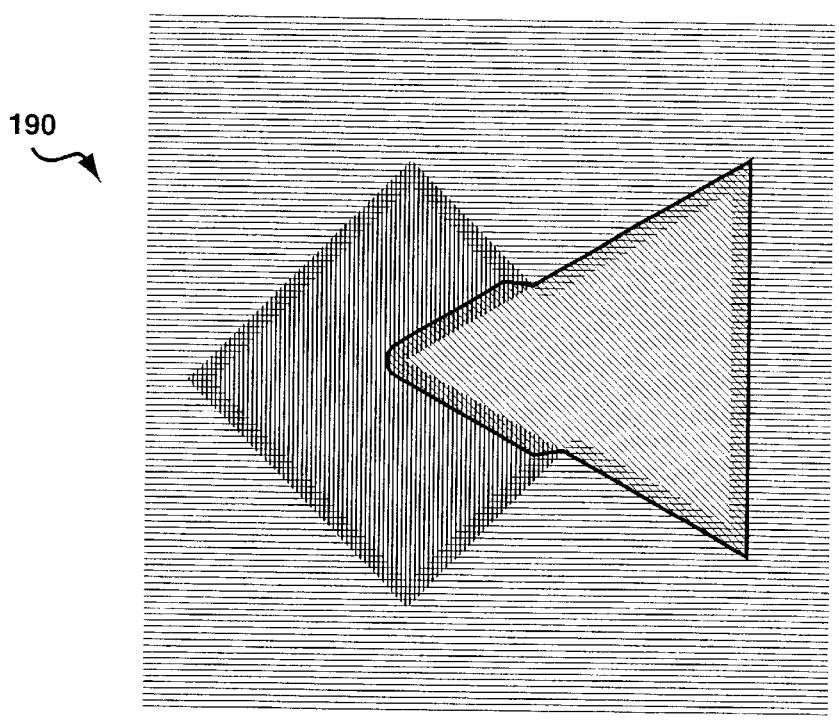
Figure 9 b

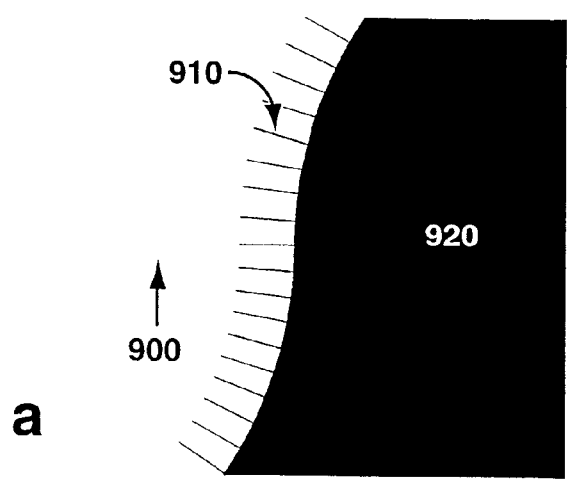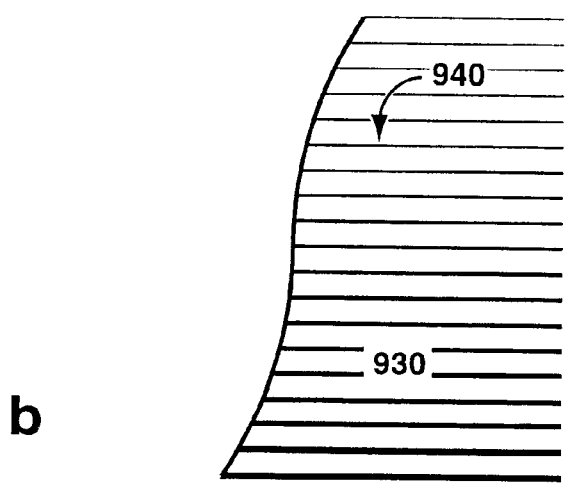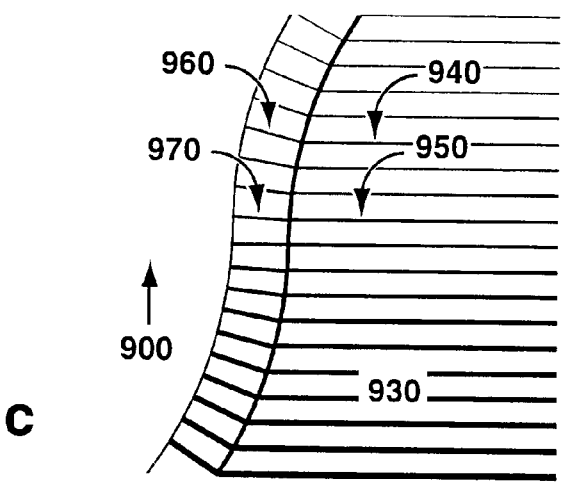
Figure 11

DEVICE AND METHOD FOR PREPARING DOCUMENTS FOR MULTICOLOR REPRODUCTION

This application is the national phase under 35 U.S.C. §371 of PCT International Application No. PCT/EP98/05174 which has an International filing date of Aug. 14, 1998, which designated the United States of America.

DESCRIPTION

The present invention relates to an apparatus and a method for providing originals for polychromatic reproduction, particularly for preparing printing documents for polychromatic printing.

Printing with four colors which are printed on top of each other is widely used. In order to produce a spectrum of colors, suitable coverages of the chromatic primary colors cyan, magenta, and yellow and the achromatic primary color black are placed successively upon each image point of a substrate. Additional colors may be applied, such as gold, silver, lime-green, and others. Mixed colors can be produced by choosing appropriate amounts of coverage in two or more colors—cyan and yellow, for example, combine to green.

Also used for polychromatic printing are screen printing and so-called flexographic printing which place several pure colors on a substrate successively.

In polychromatic printing the substrate to be printed on, preferably paper, passes several printing plates successively. The individual printing plates have to be aligned exactly with the moving substrate for objects or patterns to be placed in the desired position. In printing, as well as in similar processes for polychromatic reproduction, misregistrations may occur. Misregistrations in printing are attributed to inaccurate guidance of the substrate in the conveying apparatus as well as in perpendicular direction. It is known to compensate for such misregistrations by expanding the colors of individual color areas completely or partially into adjacent color areas. In this process color is placed on the substrate beyond the color areas originally provided. This process known as "trapping", is carried out according to predetermined criteria considering potentially adjoining colors.

In U.S. Pat. No. 5,481,379 a method for preparing polychromatic printing plates is described that is supposed to reduce such misregistration errors. In this system, first all pairs of picture elements are examined in which a color change occurs between adjoining color areas in at least one color separation. Subsequently, it is determined according to certain criteria whether a so-called frame should be made around a color area and which amount of coverage the frame should have in the different color separations. As examples, trapping rules are given, which determine whether for an existing color pair a trap is generated in the direction of one color. Furthermore combination rules are given, which determine the trap color of a frame.

In U.S. Pat. No. 5,542,052 a method is described, wherein first so-called trap areas are generated for individual color areas. Subsequently, parts of the area are removed from these proposed trap areas if they come into undesirably close proximity to other color areas or if they intersect existing trap areas.

It is an objective of the present invention to provide a device and a method to reduce registration errors in polychromatic reproduction, particularly in polychromatic printing.

This objective is attained by the features set forth in the appended claims.

The present invention is based upon the concept of analyzing color regions rather than boundaries as in the prior art. In a preferred embodiment of the method according to the invention, a distance mapping is carried out in one or a plurality of color regions within which traps are to be determined.

The invention is hereunder described with reference to examples. Reference will be made to the following drawings:

FIGS. 1a–h show the principle operation of the method according to the invention wherein all trapping processes of a primary original are carried out independently.

FIG. 5 shows an example of a primary original.

Figure 2:
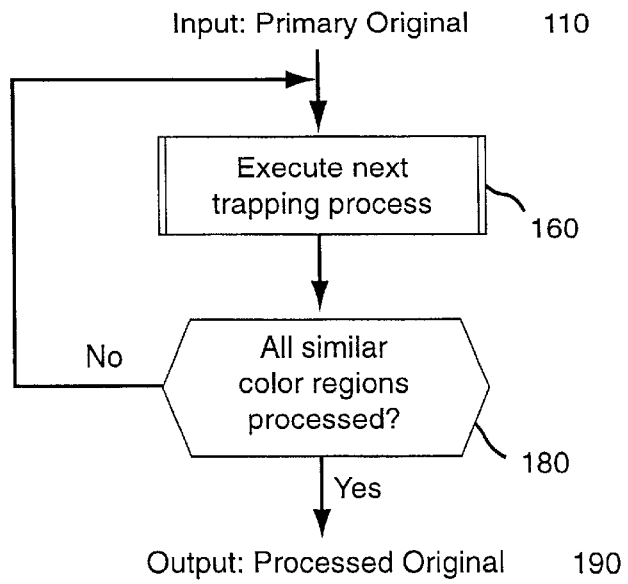
FIG. 2 shows the principle operation of the alternative method according to the invention wherein similar trapping processes are carried out repetitively.

FIGS. 6a–d show trap determination regions and trap sources for two exemplary trapping processes of the primary original of FIG. 5.

FIGS. 7a and 7b compare traps generated with a Euclidean and a orientation-dependent distance measure respectively in a section of the processed original of FIG. 9.

FIGS. 8a–f show the generation of traps in a section of the primary original of FIG. 5.

FIGS. 9a–b show the original of the example of FIG. 5 processed with a method according to the invention.

FIGS. 10a–g show the basic way of operation of the method according to the invention in narrow locations of regions within which traps are to be generated.

FIGS. 11a–c show the basic way of operation of the method of the invention when trapping color regions comprising a color gradient.

The principle operation of the method of the invention preferably comprises: partitioning a primary original consisting of picture elements into different color classes; carrying out independent trapping processes within the region of each color class without using specific trapping rules; and generating traps by selecting picture elements according to predetermined trapping rules.

From a primary original consisting of picture elements being partitioned in the sense of a mathematical definition into color classes it is preferably formed a number of non-empty, pairwise distinct subregions consisting of picture elements, which subregions jointly form the primary original.

Color classes are regions of picture elements which may be separated from each other, and which are equivalent with respect to one or several trapping rules. Other picture elements, preferably picture elements which belong to the background of the primary original, may also form color classes. Within the color classes, colors are preferably distinguished. Besides the color thereof, by further preference typographic elements of the primary original are distinguished as color classes. By still further preference, regions of picture elements belonging to logotypes or symbols as well as regions of picture elements belonging to halftone images or to predetermined color gradients are distinguished as color classes.

FIG. 1a shows an example of a partition of a primary original into six color classes 0 to 5.

The trapping processes of all color classes of a primary original are preferably carried out independently of each other. In the course of one trapping process non-specific traps of picture elements within the region of a first color class are generated provisionally; said non-specific traps originate from closest picture elements located outside in regions of second color classes and can basically trap picture elements of the first color class. Furthermore, distances of the respective picture elements are derived as values from the corresponding distance vectors by means of a predetermined mathematical distance measure.

FIG. 1b shows the region of color class 3 chosen as an example (depicted in white), and FIG. 1c shows those color classes 0, 1, 2, 4, 5 (also depicted white) which basically can trap the chosen color class.

In each independent trapping process of a plurality of first color classes, second color classes of picture elements outside the first color classes can be propagated to picture elements within the first color classes as non-specific traps by means of corresponding distance mappings, and distance vectors connecting picture elements of first and second color classes can be determined as follows:

Within the region of each color class a distance mapping is carried out. In this connection, distance vectors, the color classes of primary original forming the target color classes, and the source color classes are assigned to picture elements of the primary original. The source color classes are empty and all distance vectors carry a predetermined distance vector expressing a predetermined maximum distance. All picture elements of the original are visited more than once according to a predetermined scheme. By preference the picture elements are scanned line-by-line first in a top-down scan from the first to the last line, and second in a bottom-up scan from the last to the first line of the picture. In this process a new distance vector is assigned to each picture element if the value of the current distance vector exceeds the value of the new distance vector in the sense of a predetermined mathematical distance measure. The new distance vector is obtained first by the distance vector pointing to one of its immediate neighbors, if both picture element and neighbor are in different target color classes, or second by the sum of the distance vector pointing to one of its immediate neighbors and the distance vector of said neighbor if both picture element and neighbor are in the same target color class. If the distance vector of a picture element has been changed, in the first case the target color class, and in the second case the source color class of the immediate neighbor is entered as the source color class to be propagated of said picture element.

FIG. 1d shows both source and target color classes of non-specific traps obtained in the process described above. They correspond to the exemplary partition of the primary original into six color classes of FIG. 1a. The regions of the source color classes are represented by small numerals and the regions of the target color classes by large numerals. The regions of all color classes 0, 1, 2, 3, 4, 5 in the example are covered by non-specific traps up to a predetermined maximum distance. By preference the maximum distance for non-specific traps is chosen to correspond to the maximum trap width occurring in a predetermined trapping rule. In the example of FIG. 1d an exaggerated maximum distance has been chosen to demonstrate that regions of target color classes can be completely covered by regions of source color classes. In the example of FIG. 1d the regions of color classes 2, 3, 4 and 5 are completely covered and the regions of color classes 0 and 1 are partially covered by regions of source color classes.

Distance vectors between picture elements of target color classes and closest picture elements of source color classes, also obtained in the process described above, are depicted in FIG. 1e by lines of equal distance up to a predetermined maximum distance. For this example a Euclidean distance measure has been applied. FIG. 1e shows in the section marked e in FIG. 1d a section of the example where three target color classes 0, 1 and 5 meet.

Traps are generated preferably by selecting picture elements from non-specific traps according to predetermined trapping rules. Selections can be made according to the corresponding distance vectors as well as the corresponding source and target color classes of a picture element.

For the selection of picture elements from non-specific traps, the values of the corresponding distance vectors can be determined in the sense of a predetermined mathematical distance measure and only those picture elements can be selected which do not exceed a predetermined trap width. Trap widths can be specified by predetermined trapping rules, preferably for picture elements of all non-specific traps or for picture elements in regions of predetermined source color classes, predetermined target color classes, or predetermined pairs of source and target color classes.

FIG. 1f schematically depicts a set of exemplary trapping rules. Arrows point from source color classes to target color classes. In this example, the color classes 2 and 5 trap the color class 1; color class 1 traps the color class 3; and color classes 1, 2, and 5 trap color class 4. Here arbitrary combination rules can be assumed between the color or colors of picture elements in regions of the corresponding source and target color classes. By way of example it is assumed that the color or colors of the picture elements corresponding to the region of the source color class result from the combination. FIG. 1f shows, in addition to the source and target color classes, the trap widths of the corresponding trapping rules. They are represented schematically by line segments of different widths. In this example all trap widths are the same with the exception of traps from color class 5 to color class 1; it is half the size of the other trap widths.

Furthermore, for the selection of picture elements from non-specific traps, the corresponding source and target color classes can be examined in order to reduce the selection to only those picture elements the pairs of source and target color classes of which correspond to a pair of source and target color classes of a certain trapping rule.

FIG. 1g for example shows traps which have been prepared from the non-specific traps in FIG. 1d according to the specifications of trapping rules in FIG. 1f. The second trapping rule in FIG. 1f determines that color class 5 traps color class 1 with half of a predetermined trap width. Selected from the non-specific traps in FIG. 1d are picture elements of source color class 5 and target color class 1, whose distance vectors have values in the sense of a mathematical distance function which do not exceed half of the predetermined trap width. FIG. 1g shows them as narrow traps in the region of target color class 1. The remaining trapping rules in FIG. 1f state that color class 2 traps color class 1, color class 1 traps color class 3, and the color classes 1, 2, 3 and 5 trap color class 4 with the full trap width. Selected from non-specific traps in FIG. 1d are picture elements with (source, target) pairs of color classes (2,1), (1,3), (1,4), (2,4), (3,4) and (5,4) whose distance values do not exceed the full predetermined trap width. FIG. 1g shows them as traps in the regions of the target color classes 3 and 4.

The generation of traps by a selection of picture elements from non-specific traps can be carried out by a selection according to pairs of color classes and distance values combined, as described by the example above, or separately according to pairs of color classes and distance values.

It should be stated explicitly that the method according to the invention is not limited to any particular set of trapping rules. A different set of trapping rules as that given in the example of FIG. 1f rather would determine other traps and hence lead to different results.

The invention can be applied to originals which consist in whole or in part of geometric representations comprising line or curve segments (vector representations) for the reproduction of graphical objects particularly on cathode ray tubes or in polychromatic printing. A method of known art can be used for converting vector representations to raster representations, preferably to matrices of picture elements.

Furthermore, according to the invention in a plurality of picture elements of the primary original pairs of color classes of non-specific traps can be selected as traps directly, according to predetermined trapping rules, particularly after selection according to distance values.

In order to select pairs of color classes and the corresponding picture elements indirectly, particularly after a selection according to distance values, according to a preferred embodiment of the method according to the invention geometric representations are used which represent (vectorize) picture elements corresponding to identical pairs of source and target color classes by their contours. In particular, a process of the applicant can be used which is distributed under the registered (DE) trademark Vectory.

According to an alternative embodiment of the method according to the invention, traps extending in both directions of adjacent color classes can be generated from non-specific traps, particularly after selection according to distance values and furthermore for generating traps according to predetermined trapping rules which contain each pair of color classes at least once. This is attained by jointly selecting picture elements of non-specific traps with symmetric pairs of color classes, e.g. (1,2) and (2,1), for traps in both directions of the corresponding pair of color classes, if one of the corresponding symmetric pairs of color classes appears in a predetermined trapping rule. For the exemplary trapping rules of FIG. 1f these are the color pairs (2,1), (5,1), (1,3), (1,4), (2,4), (3,4) and (5,4). The resulting traps extend in both directions joining the regions of the following color classes: 2 and 1; 5 and 1; 1 and 3; 1 and 4; 2 and 4; 3 and 4 as well as 5 and 4. They are shown in FIG. 1h. Here it is assumed that picture elements are selected beforehand from the non-specific traps in FIG. 1d by distance values according to the trap widths specified in the trapping rules determined by way of example in FIG. 1f.

As the result of the combination of the colors in the respective source and target color classes of the thus generated traps extending in both directions, a color can be generated which does not change the color of the source color class in combination with said source color class, preferably by overprinting, and, in combination with the color of the target color class, it yields the trap color determined in the corresponding trapping rule, preferably by overprinting. Here the color of the source color class was taken as the result of the corresponding trapping rule.

A preferred application of traps extending in both directions is the subsequent reversal of the direction of traps with minimal effort. This can be attained by simply changing the combination color. In the example above a reversal of the trap direction is attained by replacing the color of the source color class by the color of the target color class as the combination result of the corresponding trapping rule.

Vectorized representations of traps extending in both directions can be generated with the invention preferably by using a vectorization method of known art.

In a preferred embodiment of the method according to the invention, results can be generated in raster form or vector form or in raster form regenerated from vector form and can be appended to or combined with the primary original in raster or vector form.

FIG. 2 shows the principle operation of the alternative method according to the invention wherein similar single trapping processes are carried out repetitively. For one or a plurality of first similar color regions a trapping process 160 is carried out using the primary original 110. The trapping process is repeated with one or more similar color regions by looping back 180 until all similar color regions of the primary original 110 are processed and the processed original 190 can be output.

One or a plurality of color regions, which may be separated from each other and have identical or similar color characteristics, are considered as a region of similar color. Regions of picture elements with identical colors are considered as having identical color characteristics. All other predetermined regions, including regions comprising color gradients, regions comprising halftone images or subregions of halftone images as well as subregions of the primary original 110 selected by the user are considered as having similar color characteristics.

Figure 3:
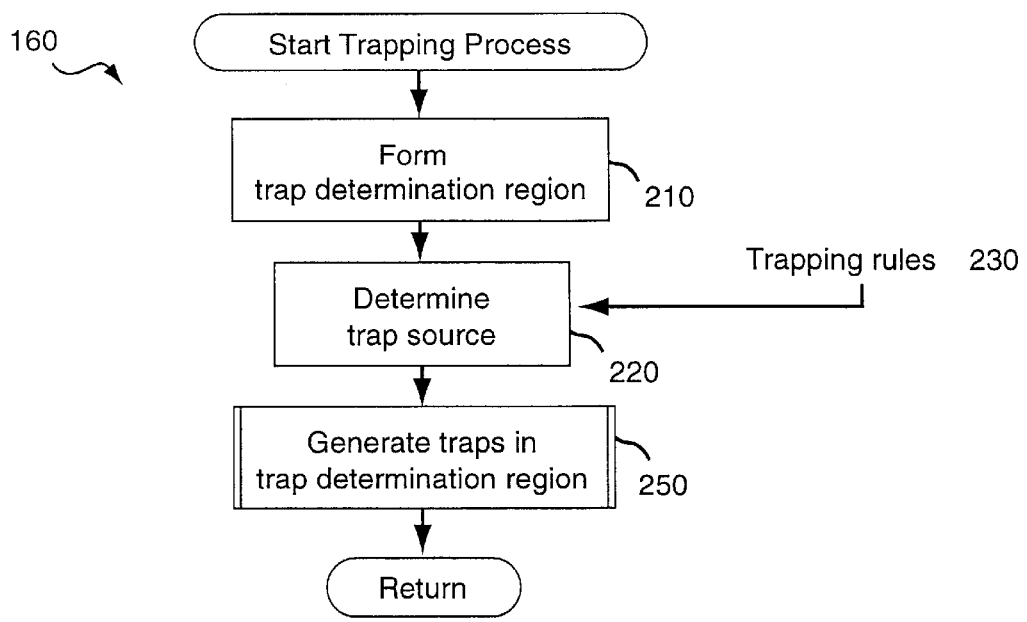
FIG. 3 is a flow chart of a single trapping process of the principle operation of the method according to the invention pursuant to FIG. 2.

The following refers to FIG. 3. In a single trapping process 160, a trap determination region is formed 210, by selecting one or a plurality of similar color regions, which may be separated from each other, from the primary original 110. Within said trap determination region traps of colors in adjacent color regions are to be determined. Picture elements of the primary original 110 or of an intermediate result of the processed original 190, are determined as trap source in step 220; their color may trap the color or colors of the picture elements in the trap determination region according to predetermined trapping rules.

The trapping rules 230 can be predetermined in data sets generally or individually for certain primary originals, or they can be computed from color pairs.

For further explanation of the generation of traps 250 within the trap determination region according to a preferred embodiment of the method according to the invention, an exemplary primary original 110 shall be considered in FIG. 5. It shows a black square 410 which is partially covered by a cyan triangle 420, and both are on a yellow background 490.

In the preferred embodiment of the method according to the present invention described below, simple trapping rules 230 are assumed for application in the individual trapping processes 160. A set of trapping rules is obtained for example by determining or having determined for each color in the primary original 110 which other colors it can be trapped with, including the possibility that it is not trapped by any color or it is trapped by one color only.

The color pairs mentioned above can be determined for instance by assuming that the darker of two colors is trapped by the lighter color. Of the colors in the primary original 110 in FIG. 5 black is the darkest, cyan is of medium lightness, and yellow is the lightest color. Yellow is not trapped by any color, cyan is trapped by yellow, and black is trapped by all other colors. In this example, wherever two different colors abut, the darker color is trapped by the lighter color. The two overlaying colors reproduced in the same location produce a trap color.

Contrary to known methods of prior art, this alternative method according to the invention disclosed below does not compare any adjacent picture elements in order to decide whether they belong to two adjacent regions. Besides the sometimes considerable savings in computation load it is irrelevant for the determination of color pairs as trapping rules explained above whether a given color pair definitely occurs in two adjacent picture elements of the primary original 110.

A preferred embodiment of the method according to the invention rather generates all traps simultaneously which trap a certain region in the sense described above as limited extensions of the corresponding adjacent regions.

Figure 4:
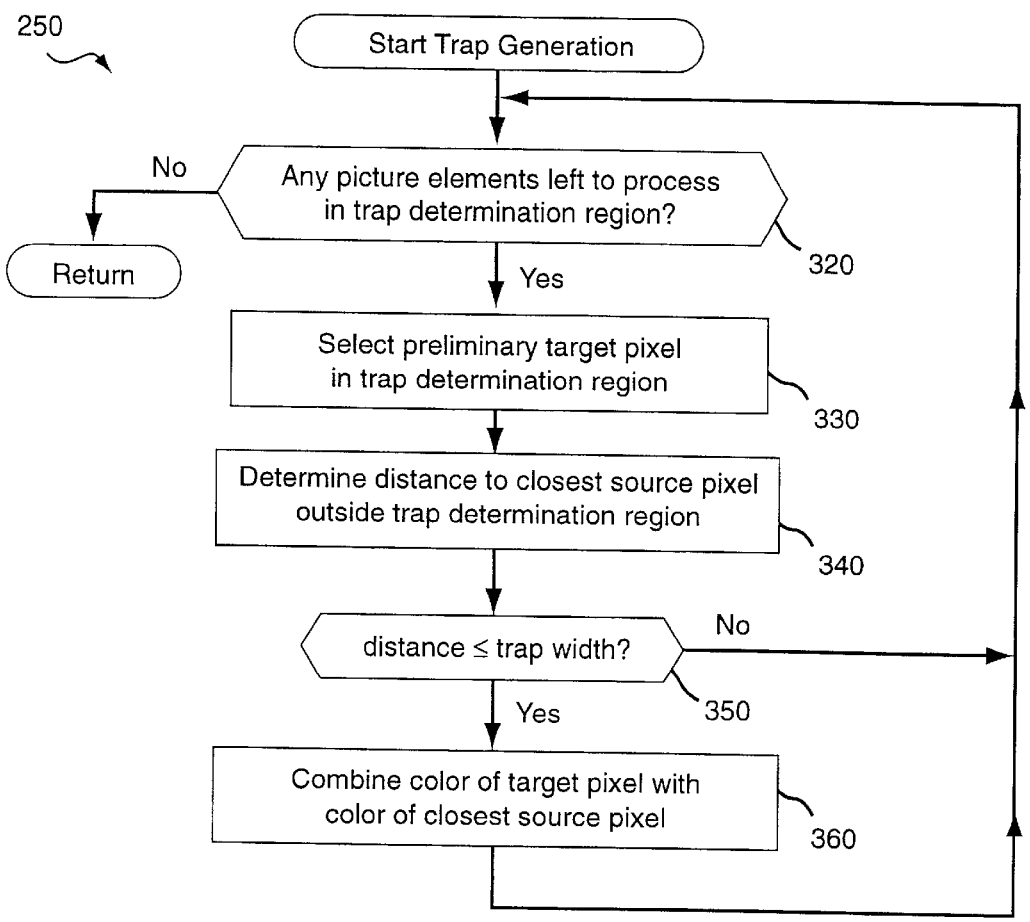
FIG. 4 shows the generation of traps in the operation of a single trapping process of FIG. 3.

The following explanation of the concept of the invention refers to FIGS. 3 and 4. The individual trapping processes result from those regions of similar color in the primary original 110 which are trapped by other colors according to predetermined trapping rules 230. For the primary original 110 the exemplary trapping rules 230 yield that cyan is trapped by yellow in the first trapping process, and that black is trapped by cyan and yellow in the second trapping process. The sequence of the trapping processes, i.e. the order of repeated executions of the sequence of instructions 160 is chosen arbitrarily.

For an explanation of a trapping process, attention is drawn to the flow chart of FIG. 3. After a trap determination region has been formed 210, and a trap source has been determined 220 according to the trapping rules 230, all traps are formed in the sequence of instructions 250 from the trap source into the trap determination region. Subsequently step 180 (see FIG. 2) is executed.

It should be stated explicitly that the method according to the invention is not limited to any particular set of trapping rules 230. Predetermining a different set of trapping rules 230 rather would yield different trap sources 220 and hence lead to different results in the processed original 190.

Figure 8:
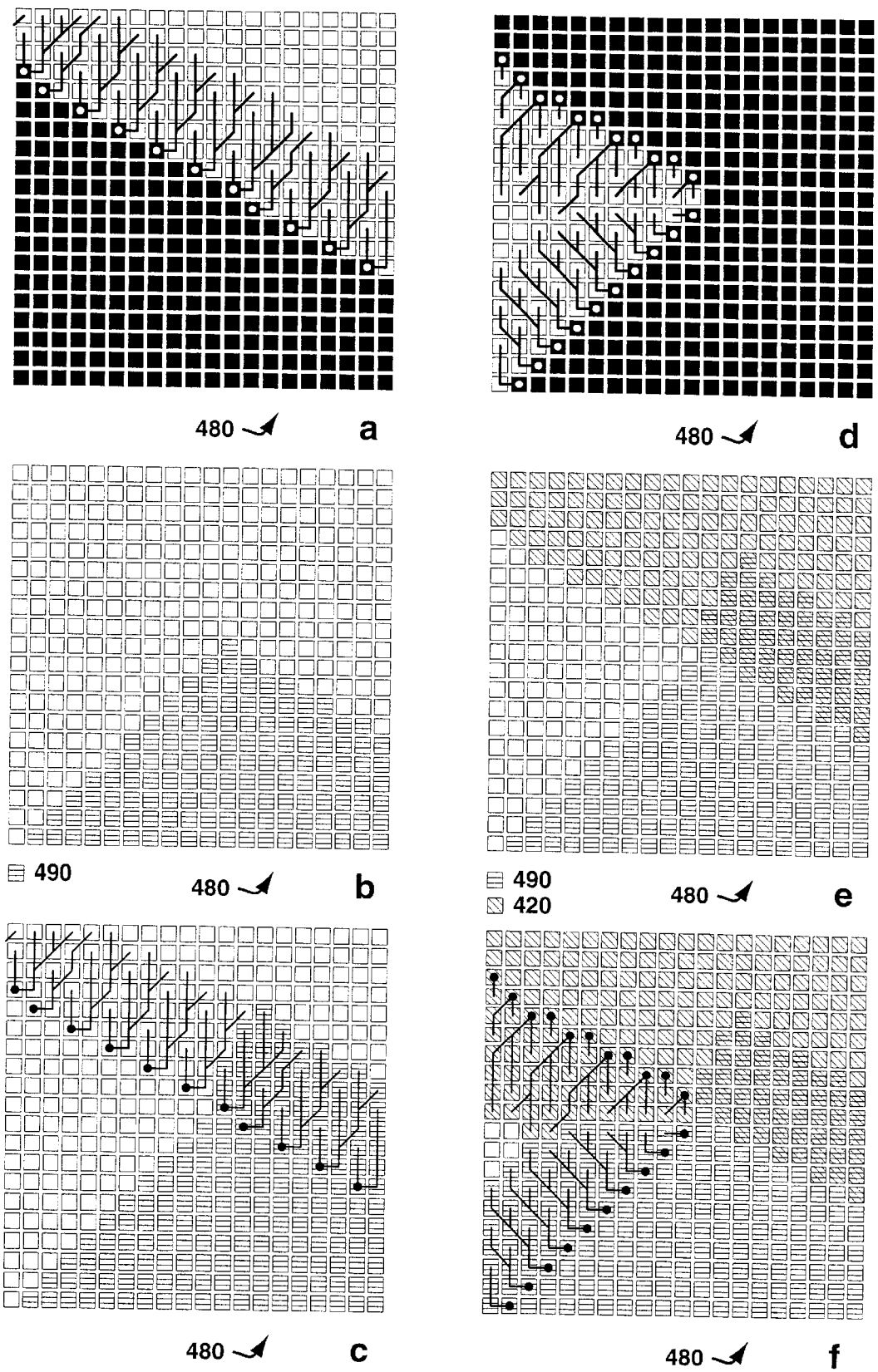

FIG. 8 shows the generation of traps in the section of the primary original 110 marked 480 in FIG. 5.

The primary original 110 contains three colors: yellow, cyan and black. It shall be assumed that each color has its own color separation and that each color is reproduced separately, e.g. is printed separately. According to the simple trapping rules: (i) cyan is trapped by yellow, and (ii) black is trapped by yellow and cyan, the traps are generated in two trapping processes. Because there are only two color regions of the colors cyan and black in the primary original 110, traps of cyan are generated in the first trapping process, and traps of black are generated in the second trapping process.

FIGS. 8a and 8d show trap determination regions during the first and second trapping process, respectively, in the section 480 of the primary original 110. FIGS. 8b and 8e show the corresponding trap sources. Finally, FIGS. 8d and 8f show the traps which are generated in the first and second trapping process.

The trap determination region of the first trapping process comprises all picture elements which carry the color cyan. A distance mapping of said trap determination region is carried out in one or more auxiliary color channels.

The region of the distance mapping is shown as a cutout in FIG. 8a. For reference, it is shown as white region in FIG. 6a. A distance mapping specifies for each picture element in the map region the distance to a closest picture element outside the map region.

For clarity, FIG. 8a shows distances up to an assumed trap width of six pixels only. A pixel represents the width of a picture element as a unit of length. Those target picture elements which share the same closest source picture element outside the trap determination region are shown in FIG. 8a connected by sequences of line segments. Source picture elements are depicted by white dots. The distances themselves are not shown.

The trap source comprises all picture elements the color of which traps the color or colors of picture elements in the trap determination region. In the first trapping process of the present example, they are determined by the color separation of the color yellow. The trap source is shown as a cutout in FIG. 8b and for reference in FIG. 6b. In the first trapping process traps are rendered in the color separation of the color yellow.

The following discussion of further details of the generation of traps 250 refers to the flow chart of FIG. 4. If it is not determined in instruction step 320 that the trap determination region is empty, a first target picture element in the trap determination region is selected provisionally in instruction step 330. The distance from said target picture element to a closest source picture element outside the trap determination region is determined in instruction step 340, preferably by "look-up" in a distance mapping of the trap determination region. If said distance is less than or equal to the predetermined trap width, the next sequence of instructions 360 is executed. Alternatively or after execution of the sequence of instructions 360 the branching step 320 is executed again. It is repeated together with the instruction steps 330, 340, 350 and 360 if necessary until all picture elements of the trap determination region are processed and control can return to the end of the sequence of instructions 250 by means of the instruction 320. In the sequence of instructions 360 the separation values (the coverage values of the color separations) of the target picture element are combined with the separation values of the source picture element in those color separations in which the trap is to be rendered. In the first trapping process of the present example the separation value of the color yellow is transferred from the source picture element to the target picture element (see FIG. 8c).

The trap determination region of the second trapping process comprises all picture elements which carry the color black. A distance mapping of said trap determination region is carried out in one or more auxiliary color channels.

The trap determination region of the second trapping process is shown as a cutout in FIG. 8d. For reference, it is shown as white region in FIG. 6c. Again distances are considered up to an assumed trap width of six pixels only.

The trap source comprises all picture elements the color of which traps the color or colors of the picture elements in the trap determination region. In the second trapping process of the present example they are determined by the color separations of the colors yellow and cyan. The trap source is shown as a cutout in FIG. 8e and for reference in FIG. 6d. FIG. 8e also shows the trap of yellow by cyan already generated in the first trapping process. The reproduction of the superimposed colors yellow and cyan in the corresponding area produces, for example, a green color.

In the second trapping process the traps are rendered in the color separations of the colors yellow and cyan. In each picture element of the trap determination region, to which a closest picture element outside the trap determination region is closer than a predetermined trap width, the separation values of the trap source of said closest picture element are entered (see FIG. 8f). The reproduction of the superimposed colors in this area produces for instance a black color which is oversaturated with yellow and cyan.

An alternative way to specify the trap source of a trapping process 160 is for example to provide a mask which determines for each picture element which of the following separation values should be used as trap source: either the constant separation values for zero coverage or the separation values of the primary original 110 or an intermediate result. In instruction step 360 the simple combination rule of transferring the separation values from source to target picture elements can be replaced for instance by a combination rule which takes the maximum values in each separation of source and target picture elements as the separation values of the corresponding target picture element.

FIG. 9 shows the original 190 of the present example processed according to the trapping method of invention: all color separations yellow, cyan, and black are shown in superposition including traps. The separation of the color black has not been changed. In FIGS. 9a and 9b the color regions contained in the separations of the color yellow and cyan respectively are emphasized by framing.

The preceding example has been described by means of colors in individual separations for the colors yellow, cyan, and black, respectively. As it has been outlined, arbitrary colors may be used. The method is generally applicable.

As a further example, colors with separation values according to the following table are chosen for the regions 490, 420 and 410 of the primary original 110:

|   | 490 | 420 | 410 |
|---|-----|-----|-----|
| C | 20  | 60  | 80  |
| M | 60  | 20  | 50  |
| Y | 60  | 60  | 30  |
| K | 10  | 10  | 10. |

Cyan, magenta, yellow, and black are denoted C, M, Y and K, respectively. As a first trapping rule, it is assumed that the color of the region 420 is trapped by the color of the region 490 and that both colors are combined to the trap color designated U1 in the following table:

|   | 420 | 490 | U1  |
|---|-----|-----|-----|
| C | 60  | 20  | 60  |
| M | 20  | 60  | 60  |
| Y | 60  | 60  | 60  |
| K | 10  | 10  | 10. |

As second and third trapping rules, it is assumed that the color of the region 410 is trapped by the color of the region 420, resulting in the trap color U2, as well as by the color of the region 490, resulting in the trap color U3 as listed in the following tables:

|   | 410 | 420 | U2  |
|---|-----|-----|-----|
| C | 80  | 60  | 80  |
| M | 50  | 20  | 50  |
| Y | 30  | 60  | 60  |
| K | 10  | 10  | 10  |

| and |     |     |     |
|-----|-----|-----|-----|
|     | 410 | 490 | U3  |
| C   | 80  | 20  | 80  |
| M   | 50  | 60  | 60  |
| Y   | 30  | 60  | 60  |
| K   | 10  | 10  | 10. |

The first trapping rule determines the traps in the region of the color 420, the first trap determination region in FIG. 6a. The second and third trapping rule determine the traps in the region of the color 410, the second trap determination region in FIG. 6b.

FIG. 7a illustrates in a section of the processed original in FIG. 9 a portion of the trap of the cyan triangle 420 into the black square 410. In the distance measurement of instruction step 340 (see FIG. 4) a Euclidean distance measure was used wherein the distance between two picture elements measuring for example three lines and four columns of the picture is evaluated as follows: 5=square root of $(3^2+4^2)$. The Euclidean distance measure is used preferably to generate traps which spread uniformly in all directions.

FIG. 7b shows in the same section of FIG. 9 a part of a trap, which has been generated with a orientation-dependent distance measure. As indicated by the direction arrows, said trap spreads non-uniformly in different directions. Orientation-dependent distance measures are used preferably to reduce registration errors in polychromatic reproduction which are also orientation-dependent, wherein the correction in directions where only no or minor misregistrations are to be expected is as low as possible.

By preference the generation 250 of traps in a trap determination region is carried out by means of a distance mapping. A distance mapping is implemented as follows:

A distance mapping is carried out in an original comprising picture elements associated with distance vectors. Initially, a vanishing distance vector is assigned to picture elements outside the map region, and a predetermined distance vector expressing a predetermined maximum distance is assigned to picture elements inside the map region.

All picture elements of the original are visited more than once according to a certain scheme. In this process a new distance vector is assigned to each picture element, said distance vector is determined by the sum of the distance vector directed to one of its immediate neighbors and the distance vector of that neighbor, provided that the value of the sum vector is less than the value of the old distance vector in the sense of a predetermined mathematical distance measure.

A description of a certain method of distance mapping is given for example in a paper by P.-E. Danielsson entitled: "Euclidean Distance Mapping", which is published in the journal "Computer Graphics and Image Processing", volume 14, page 227–248 (1980).

By means of a distance mapping color values corresponding to picture elements outside the trap determination region can be propagated as traps onto picture elements inside the trap determination region, as follows:

A distance mapping is carried out in an original comprising picture elements associated with distance vectors and predetermined color values to be propagated. Initially, a vanishing distance vector and a predetermined color value to be propagated are assigned to picture elements outside the trap determination region, and a predetermined distance vector expressing a predetermined maximum distance, and preferably a neutral color value to be propagated are assigned to picture elements inside the trap determination region.

All picture elements of the original are visited more than once according to a certain scheme. In this process a new distance vector determined by the sum of the distance vector directed to one of its immediate neighbors and the distance vector of that neighbor, provided that the value of the sum vector is less than the value of the old distance vector in the sense of a predetermined mathematical distance measure, is assigned to each picture element. In this case the color value to be propagated of said immediate neighbor is combined with the old color value to be propagated of said picture element to a new color value to be propagated of said picture element.

An example of the propagation of color values as described above is shown in FIGS. 8c and 8f including "dendrites" pointing from source picture elements of a trap source to target picture elements in a trap determination region.

Narrow locations of areas in which traps are to be generated often pose problems. They include the following effects (see FIGS. 10a to 10c): (1) a trap 801 from an area 800 into an area 810 intersects a neighboring area 820 causing an undesired overlap in the reproduction 819; (2) traps 802 and 821 from different areas 800 and 820 intersect each other causing an undesired overlap in the reproduction 829; a trap 803 from an area 800 into an area 810 is too close to a neighboring area 820 and stands out in case of minor misregistrations in the reproduction of this area 829. The mentioned effects occur in primitive methods which generate traps assuming an undisturbed course of said traps.

Figure 10:
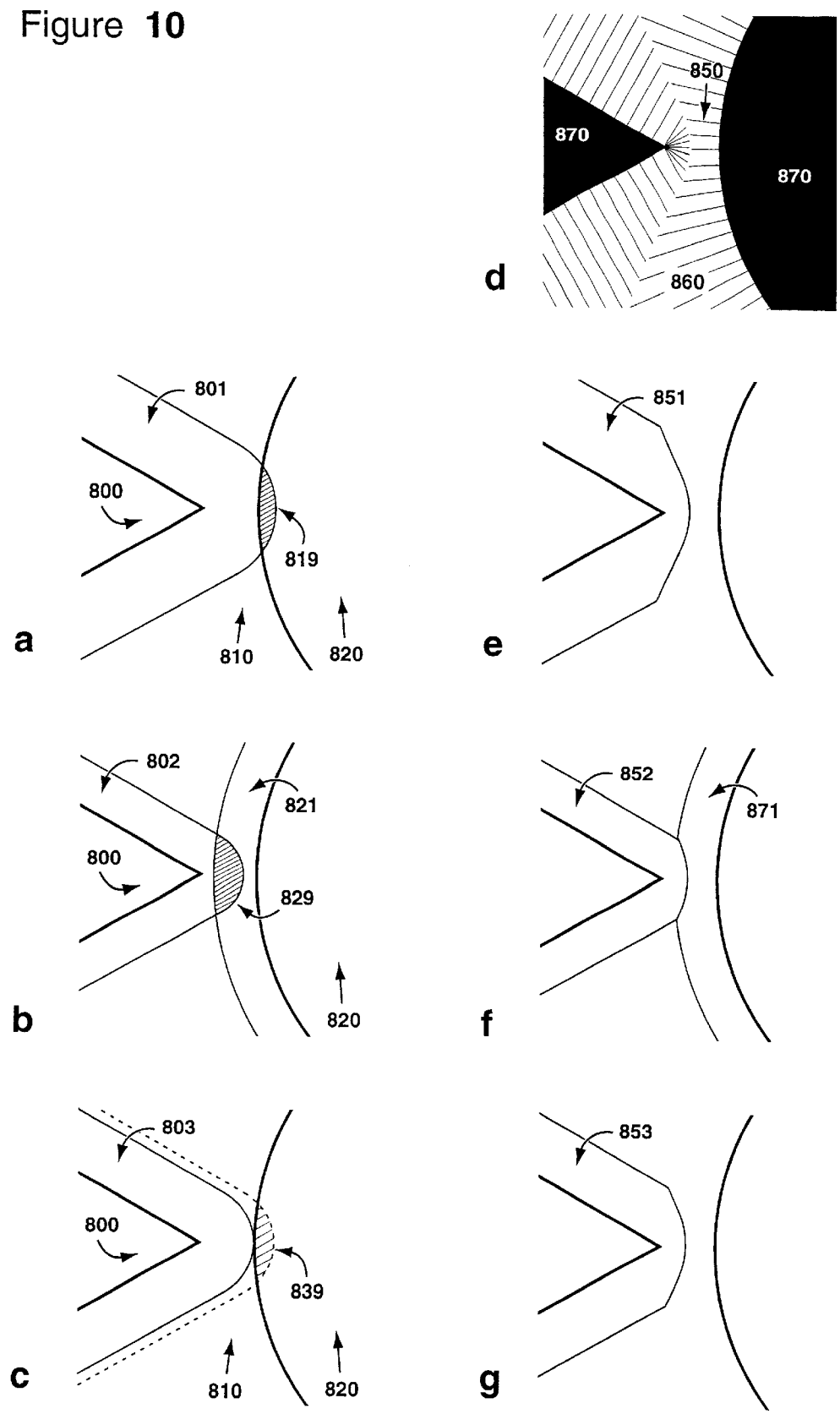

These effects are largely prevented if precautions are taken that traps do not cross the median of narrow locations. Thus traps are not immediately prominent in the reproduction in the event of misregistrations and resist prominence uniformly in all directions to maximum degree. FIG. 10d shows a section of the distance mapping in the trap determination region 860 which belongs to the examples in FIGS. 10a to 10c. The distance map is depicted schematically by "lines of slope" 850 (lines of maximal change in distance as the "dendrites" in FIG. 8 before) without restriction to a particular trap width. The lines of slope point from picture elements of the trap determination region 860 to closest elements outside the trap region 870. Traps generated according to a preferred embodiment of the method according to the present invention always follow the restriction not to cross the median or, expressed more illustratively, the "distance sheds" of a trap determination region. This property is independent of the predetermined trap width or trap widths 851, 852, 853. Said property is further independent of the occurrence of traps in narrow locations either as single 851, 853 or multiple traps 852 and 871.

Methods according to prior art which first generate traps assuming an undisturbed course of said traps, and consider traps already generated or neighboring or proximate areas of the original separately, have to adapt or change the shapes of the primitive traps often with considerable effort in order to obtain for instance the desirable course of traps described above.

The method according to the present invention generates all traps of a primary original without comparing any traps with each other or with color regions of the primary original.

Color gradients present a further problem for trapping. For traps of color regions comprising a color gradient, it is important to smoothly blend the color gradient into the trap. With methods according to prior art said traps often can be generated with considerable processing effort only.

FIG. 11 shows the basic operation of the method according to the present invention for trapping color regions comprising a color gradient. In FIG. 11a the distance mapping of a trap determination region 900 is depicted again by "lines of slope" 910. They point from picture elements of the trap determination region 900 to closest elements outside the trap region 920. In an adjacent trap source 930 wherein a linear color gradient is assumed, picture elements of identical color are depicted schematically by lines of identical width 940. For traps generated according to a preferred embodiment of the method according to the present invention, different colors 940, 950 of a gradient in a trap source 930 always follow the "lines of slope" 910 of a trap determination region 900 and thus propagate a color gradient smoothly 960, 970.

The method according to the present invention generates traps of color regions with color gradients without any additional effort compared to traps of simple color regions with "flat" colors.

According to a further preferred embodiment of the method according to the present invention, the distance between target and source picture elements is considered in the combination of the separation values in instruction step 360 (see FIG. 4), for instance in order to reduce the propagation of traps.

If a primary original 110 contains text elements, then by preference different trapping rules are applied for the text elements and for the remaining parts of the primary original, e.g. to minimize distortions of the forms of letters.

Situations arise in which traps generated according to the present invention are stored preferably as intermediate results. Thus it is prevented that separation values of the primary original which are needed for other traps are overwritten. This happens for instance in generating traps which have to be propagated into two abutting color regions, particularly if both color regions comprise color gradients.

The invention can be combined with an image processing system of known art, wherein the method according to the present invention can be used as a so-called program extension or "plug-in".

With the invention, originals can be prepared which serve directly or indirectly as printing documents for polychromatic printing.

In a preferred embodiment of the present invention, the primary original is first split into partial areas, preferably bands or tiles, wherein the partial areas overlap each other to prevent boundary errors. Subsequently, each primary partial area is processed individually and thereafter combined with the remaining processed partial areas to a completely processed original.

An apparatus according to the present invention for preparing a primary original comprising picture elements by preference comprises a raster image processor (RIP) for processing and a frame buffer for storing the primary original, as well as auxiliary color channels. Both units are used for instance in electronic prepress equipment.

In order to control the devices of the apparatus according to the present invention, by preference a computing program is executed on a suitable raster image processor. Particularly, this program can be expressed in a page description language, e.g. in PostScript (PostScript is a registered trademark of Adobe Systems Inc. in San Jose, Calif. 95110, USA).

What is claimed is:

1. A method for preparing a primary original consisting of picture elements for producing processed originals for polychromatic reproduction, comprising the following steps:

(a) partitioning the primary original into regions which are each assigned to a color class, (b) determining target picture elements within the region of each color class by associating the picture elements to which a source picture element located outside said region is closest according to a predetermined distance measure, (c) labeling non-specific traps in the target picture elements with the color classes of the associated source picture elements and the corresponding distance measures, and (d) generating traps according to predetermined trapping rules by selecting picture elements whose distance measure does not exceed a predetermined trap width and whose color class determined in step (a), together with the color class of a non-specific trap determined in steps (b) and (c), corresponds to a predetermined trapping rule.

2. The method of claim 1, wherein the association of the picture elements in step (b) is carried out for each region by means of a corresponding distance mapping.

3. The method of claim 1 or 2, wherein the primary original is present in vector form or in mixed raster or vector form, and is converted to raster form, preferably to a matrix of picture elements, prior to performing steps (a) to (d).

4. The method of claims 1 to 3, wherein in step (d), particularly after the selection according to distance values, the selection according to pairs of color classes is carried out for picture elements of the primary original.

5. The method of claims 1 to 3, wherein in step (d), particularly after the selection according to distance values, the selection according to pairs of color classes is carried out in a vectorized representation, preferably in a geometric representation of the outlines of picture elements which belong to identical pairs of color classes.

6. The method of claims 1 to 3 wherein in step (d) traps extending in both directions towards adjacent color classes are generated.

7. The method of claim 6, wherein a vectorized representation of the traps in both directions is performed.

8. The method of claim 4 or 6, wherein the traps in raster form are appended to or combined with the primary original in raster or vector form.

9. The method of claim 5 or 7, wherein the traps in vectorized form are appended to or combined with the primary original in raster or vector form.

10. The method of claim 5 or 7, wherein the traps in vectorized form are converted to raster form and appended to or combined with the primary original in raster or vector form.

11. The method, in particular according to claim 1, for preparing a primary original consisting of picture elements and further comprising a plurality of color regions, wherein similar color regions may be separated from each other, for producing processed originals for polychromatic reproduction, comprising the following steps:

(a) forming a trap determination region comprising one or a plurality of first similar color regions, (b) determining the trap source which comprises picture elements the color of which can trap said first similar color regions according to predetermined trapping rules, (c) determining target picture elements within the trap determination region by associating the picture elements to which a source picture element located outside the trap determination region is closest according to a predetermined distance measure and which is located within a predetermined trap width, and (d) combining the colors of the target picture elements with the colors of the associated source picture elements according to a combination rule, wherein the trapping process comprising steps (a) to (d) may be repeated for further regions of similar color and the corresponding trap sources.

12. The method of claim 11, wherein in step (c) the association of picture elements is carried out by means of a distance mapping.

13. The method according to any one of claims 1 to 12, wherein each color or color class is associated with at least one color separation.

14. The method of claim 13 wherein in step (d) the separation values of the target picture elements are combined with the separation values of the source picture elements.

15. The method according to any one of claims 1 to 14, wherein the distance measure is a mathematical distance function, preferably a Euclidean distance measure.

16. The method according to any one of claims 1 to 15, wherein the distance measure is orientation-dependent.

17. The method according to any one of claims 1 to 16, wherein different combination rules are applied for the combination of separation values of target picture elements with separation values of the associated source picture elements, depending on the distance between said target and source picture elements.

18. The method of claim 17 wherein the combination rule is varied such that, with increasing distance of a target picture element to a source picture element, the contribution of the associated source picture element to the amount of coverage in color separations decreases.

19. The method according to any one of claims 1 to 18, wherein an original comprises a plurality of regions for which different trapping rules apply.

20. The method according to any one of claims 1 to 19, wherein traps of one or more trapping processes are stored as intermediate results and combined with other trap results or intermediate results.

21. The method according to any one of claims 1 to 20, wherein the method is carried out in an image processing system of known art.

22. The method according to any one of claims 1 to 21, wherein the processed originals are used for producing printing documents for polychromatic printing.

23. The method according to any one of claims 1 to 22, wherein the method is applied to partial areas, preferably bands or tiles, which are obtained by partitioning the primary original, and wherein each partitioned primary area is processed separately and thereafter combined with the remaining partially processed areas to a completely processed original.

24. An apparatus for preparing a primary original consisting of picture elements in order to produce processed originals for polychromatic reproduction, comprising:

(a) a first device for partitioning the primary original into regions which are each assigned to a color class, (b) a second device for determining target picture elements within the region of each color class by associating the picture elements to which a source picture element located outside said region is closest according to a predetermined distance measure, (c) a third device for labeling non-specific traps in the target picture elements with the color classes of the associated source picture elements and the corresponding distance measures, and (d) a fourth device for generating traps according to predetermined trapping rules by selecting picture elements whose distance measure does not exceed a predetermined trap width and whose color class determined in step (a), together with the color class of a non-specific trap determined in steps (b) and (c), corresponds to a predetermined trapping rule.

25. The apparatus, in particular according to claim 24, for preparing a primary original consisting of picture elements and further comprising a plurality of color regions, wherein similar color regions may be separated from each other, for producing processed originals for polychromatic reproduction, comprising:

(a) a first device for forming a trap determination region comprising one or a plurality of first similar color regions, (b) a second device for determining the trap source which comprises picture elements, the color of which can trap said first similar color regions according to predetermined trapping rules, (c) a third device for determining target picture elements within the trap determination region by associating the picture elements to which a source picture element located outside the trap determination region is closest according to a predetermined distance measure, and which is located within a predetermined trap width, and (d) a fourth device for combining the colors of the target picture elements with the colors of the associated source picture elements according to a combination rule.

26. The apparatus of claim 24 or 25, wherein the first to the fourth device are provided by means of a raster image processor (RIP) which preferably has at least one frame buffer.

27. Apparatus according to any one of claims 24 to 26, wherein the devices and the raster image processor, respectively, are controlled according to the methods of any one of claims 1 to 23.

* * * * *